HENRY F. W. WESCHE.

Improvement in Gas-Heaters.

No. 115,666. Patented June 6, 1871.

Witnesses:
Arthur Neill
Emile Moltz

Inventor.
Henry F. W. Wesche

UNITED STATES PATENT OFFICE.

HENRY F. W. WESCHE, OF NEW YORK, N. Y.

IMPROVEMENT IN GAS-HEATERS.

Specification forming part of Letters Patent No. 115,666, dated June 6, 1871.

I, HENRY F. W. WESCHE, of the city, county, and State of New York, have invented certain Improvements in Cooking Apparatus, of which the following is a specification:

This invention relates to that class of cooking-stoves which is heated by a fluid-lamp or by gas; and it consists of a metallic fluid-lamp placed in a stand, and surmounted by a flame-chamber, which, in turn, sustains a series of pots, placed one above the other, for reception of different kinds of edibles, the boiling of the contents of the pots being effected by heat derived from the liquid-fuel lamp, and partly by steam generated within the pots and conveyed from one to the other, by means of which a dinner consisting of four or more dishers or pots can be cooked all at the same time by one and the same lamp or furnace, and a saving of labor and fuel obtained. It also consists of constructing the flame or combustion-chamber with an air-space for the purpose of retaining the heat in said chamber, and of arranging in the chamber lamp-windows for the purpose of illuminating the room in which the cooking-apparatus is employed by means of the same lamp, as I will further explain by reference to the accompanying drawing, of which—

Figure 1:
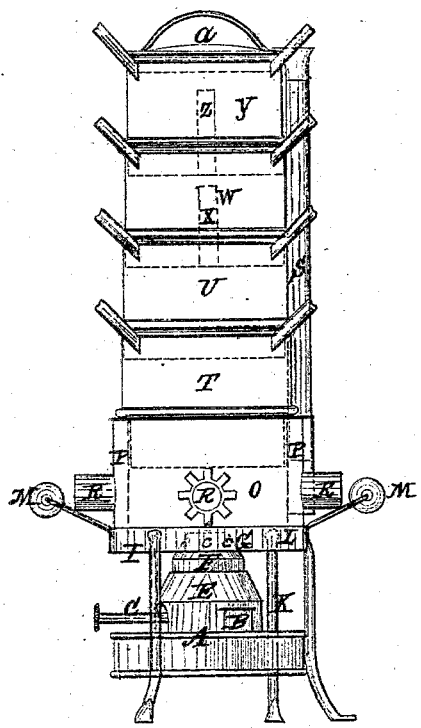
Figure 2:
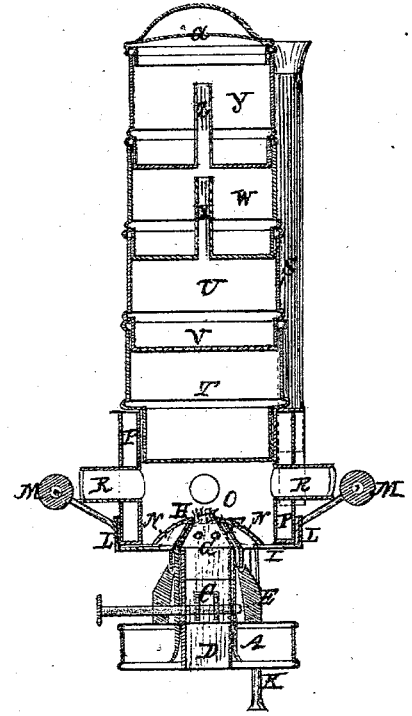
Figure 3:
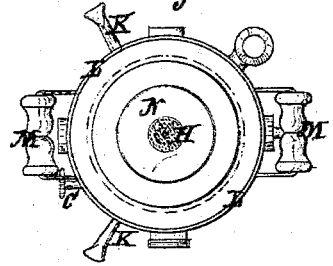
Figure 4:
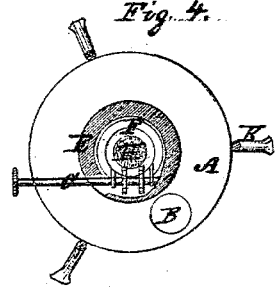

Figure 1 represents an elevation of my invention, showing the series of pots placed one above the other; Fig. 2, a vertical section of same; Fig. 3, a top view of fuel-chamber; and Fig. 4, a horizontal section through lamp.

In the said drawing, A indicates a metallic lamp, of which B is the feed-tube; C, the wick-elevator, placed in the neck D of the lamp; E, a wooden cap, employed as a non-conductor of heat; and F, a metallic burner, perforated with holes G for supplying air for combustion to the wick H. This metallic burner (which may have one or more branches) encircles the wick, and is, in turn, encircled by the wooden cap E. I is the stand which sustains the lamp A, said stand having feet K K, a platform, L, for reception of the combustion-chamber, and handles M M for moving the apparatus from one place to another; and N is a concave plate placed over the wick for concentrating the flame thereof. O is the combustion-chamber, composed of a hollow cylinder, P, for retaining the heat of the flame. This flame or combustion-chamber is provided with lamp-windows R R, &c., for illuminating the chamber in which the cooking apparatus is placed, so that the cooking of the edibles and illumination of the room are performed by the same lamp; and S is a pipe leading upward from said chamber, for exit of any smoke or gases generated by the flame of the lamp. T is the first of the series of pots, of which there may be one or more, placed over and in the combustion-chamber. U is the next pot, placed in and above the pot T, and having a perforated bottom, V, through which the steam generated in the pot T enters. W is the third pot of the series, which receives the steam generated in the pots T U through the pipe X; and Y is the last of the series of pots, which receives steam from the lower pots through the pipe Z, this latter pot having a steam-tight cover, a.

I claim—

The cooking apparatus, composed of the stand I, lamp A with cap and burner F E, combustion and illuminating chamber O R R, pipe S, and pots T, U, W, and Y, constructed arranged, and operating substantially as and for the purposes described and set forth.

In testimony whereof I hereunto set my signature this 2d day of March, 1870.

HENRY F. W. WESCHE.

Witnesses:
 ARTHUR NEILL,
 EMILE MOLTZ.